(12) United States Patent
Sauerbier et al.

(10) Patent No.: US 12,042,677 B2
(45) Date of Patent: Jul. 23, 2024

(54) PORTABLE TOOL FOR MOBILE USE

(71) Applicant: LUKAS Hydraulik GmbH, Erlangen (DE)

(72) Inventors: Carsten Sauerbier, Lauf an der Pegnitz (DE); Uwe Kirchner, Marloffstein (DE)

(73) Assignee: LUKAS HYDRAULIK GMBH, Erlangen (DE)

( * ) Notice: Subject to any disclaimer, the term of this patent is extended or adjusted under 35 U.S.C. 154(b) by 787 days.

(21) Appl. No.: 17/252,440

(22) PCT Filed: Jun. 26, 2018

(86) PCT No.: PCT/EP2018/067010
§ 371 (c)(1),
(2) Date: Dec. 15, 2020

(87) PCT Pub. No.: WO2020/001740
PCT Pub. Date: Jan. 2, 2020

(65) Prior Publication Data
US 2021/0252316 A1    Aug. 19, 2021

(51) Int. Cl.
*A62B 3/00* (2006.01)
*B25F 5/00* (2006.01)
(Continued)

(52) U.S. Cl.
CPC ............ *A62B 3/005* (2013.01); *B25F 5/005* (2013.01); *B25F 5/02* (2013.01); *G01K 1/026* (2013.01);
(Continued)

(58) Field of Classification Search
CPC ............ A62B 3/005; B25F 5/005; B25F 5/02; H02K 11/25; H02K 11/33; H02K 11/0094;
(Continued)

(56) References Cited

U.S. PATENT DOCUMENTS

| 5,477,680 A | 12/1995 | Heskey et al. |
| 2006/0108569 A1 | 5/2006 | Schutz |

(Continued)

FOREIGN PATENT DOCUMENTS

| DE | 10 2008 003 786 A1 | 7/2009 |
| JP | 2015160302 A * | 9/2015 |

(Continued)

OTHER PUBLICATIONS

Office Action issued Jun. 30, 2022 in Indian Application No. 202017051099.
(Continued)

*Primary Examiner* — Stephen F. Gerrity
*Assistant Examiner* — Linda J Hodge
(74) *Attorney, Agent, or Firm* — Panitch Schwarze Belisario & Nadel LLP

(57) ABSTRACT

A portable tool, such as a spreader tool, cutting tool or combination spreading/cutting tool is for mobile use. The tool has an electric motor, a rechargeable battery received on the tool, a mechanically or hydraulically driven, displaceable piston rod for performing spreading and/or cutting and/or lifting or pressing. An electronic control and regulation unit controls/regulates the electric motor, such as a brushless DC motor. The electronic control and regulation unit specifies a first operating mode in which the electric motor is operated at a first frequency, and a second operating mode in which the electric motor is operated at a second frequency. The operating mode is switchable by an operator of the tool using a manually operable switch between the first and the second operating modes. The rotational speed of a three-phase current electric motor is higher at the second frequency than at the first frequency.

16 Claims, 7 Drawing Sheets

Figure 1:
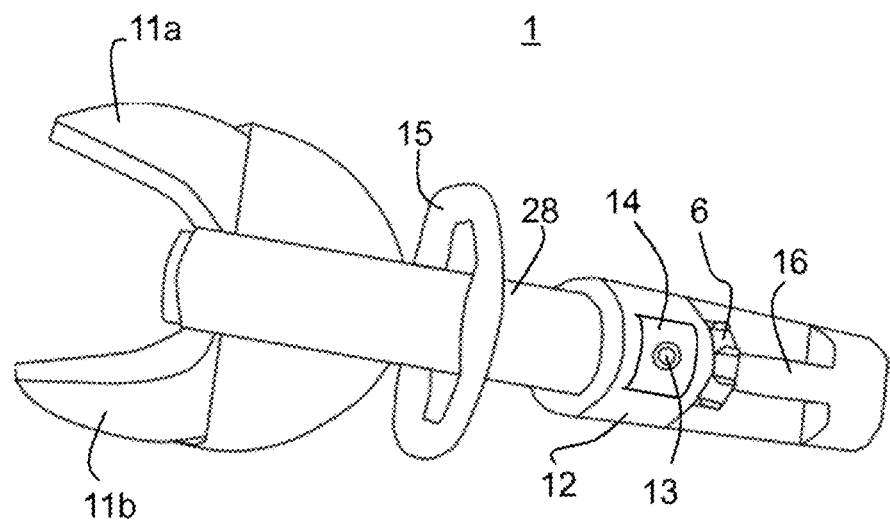

(51) Int. Cl.
  *B25F 5/02* (2006.01)
  *G01K 1/02* (2021.01)
  *G01K 7/16* (2006.01)
  *H02K 7/14* (2006.01)
  *H02K 11/00* (2016.01)
  *H02K 11/25* (2016.01)
  *H02K 11/33* (2016.01)
  *H02P 29/40* (2016.01)
  *H02P 29/68* (2016.01)

(52) U.S. Cl.
  CPC .............. *G01K 7/16* (2013.01); *H02K 7/145* (2013.01); *H02K 11/0094* (2013.01); *H02K 11/25* (2016.01); *H02K 11/33* (2016.01); *H02P 29/40* (2016.02); *H02P 29/68* (2016.02)

(58) Field of Classification Search
  CPC ......... H02K 7/145; H02P 29/40; H02P 29/68; G01K 1/026; G01K 7/16
  See application file for complete search history.

(56) References Cited

U.S. PATENT DOCUMENTS

| | | | | |
|---|---|---|---|---|
| 2007/0085496 | A1* | 4/2007 | Philipp | A61B 17/151 318/139 |
| 2007/0210733 | A1* | 9/2007 | Du | H02K 1/278 318/268 |
| 2013/0038148 | A1* | 2/2013 | Chen | H02K 7/145 310/50 |
| 2014/0055086 | A1* | 2/2014 | Malackowski | H02J 7/00036 320/107 |
| 2015/0034352 | A1* | 2/2015 | Hirschburger | H02K 7/102 173/217 |
| 2015/0209950 | A1* | 7/2015 | Lutz | B25F 5/02 173/20 |
| 2018/0021603 | A1 | 1/2018 | Horne et al. | |
| 2018/0117745 | A1 | 5/2018 | Murakami et al. | |
| 2019/0083821 | A1 | 3/2019 | Sauerbier et al. | |
| 2021/0316437 | A1* | 10/2021 | Schmollngruber | F04B 17/03 |

FOREIGN PATENT DOCUMENTS

| | | |
|---|---|---|
| JP | 2016096722 A | 5/2016 |
| JP | 2017-71003 A | 4/2017 |
| JP | 2017192347 A | 10/2017 |
| JP | 2019510644 A | 4/2019 |
| WO | 03/080187 A1 | 10/2003 |
| WO | 2012/019758 A1 | 2/2012 |
| WO | 2013/127452 A1 | 6/2013 |
| WO | 2014/005839 A1 | 1/2014 |
| WO | 2015/024809 A1 | 2/2015 |
| WO | 2017/190799 A1 | 11/2017 |

OTHER PUBLICATIONS

Office Action issued Jun. 4, 2022 in JP Application No. 2020-570490.

Notice of Allowance, dated Oct. 7, 2022 in JP Application No. 2020-570490.

Weber Rescue UK: "E-FORCE 2 Spreaders: Performance & Handling", YouTube, 8 pages (Jan. 23, 2016), YouTube.com, https://www.youtube.com/watch?v=AbCQ_Dwr04o.

"Betriebsanleitung Akku-Rettungsgerate, E-FORCE 2", Weber Rescue Systems, 95 pages (2016); Machine-generated translation.

International Search Report and Written Opinion of the International Searching Authority for International Patent Application No. PCT/EP2018/067010 mailed Feb. 25, 2019, 11 pages.

\* cited by examiner

PORTABLE TOOL FOR MOBILE USE

This application is a National Stage Application of PCT/EP2018/067010, filed 26 Jun. 2018, which application is incorporated herein by reference. To the extent appropriate, a claim of priority is made to the above-disclosed application.

The present invention relates to an electromechanical or electrohydraulic work tool for mobile use, such as a spreading tool, cutting tool, or combination tool having cutting and spreading functions or a lifting jack (or rescue ram). The aforementioned objects are respectively used preferably in rescue operations.

Technological Background

Mobile electromechanical or electrohydraulic work tools or rescue tools of the type of interest here, which can be carried by an operator, are used in diverse applications. For example, there are spreading tools, cutting tools, or so-called combination tools, i.e., tools with cutting and spreading functions and rescue rams, which are used by rescue personnel (fire department) for example to rescue injured individuals from accident vehicles or to extricate earthquake victims. The type of work tools or rescue tools is hereby diverse. There are electrohydraulically or electromechanically driven work tools or rescue tools having, preferably hardened, tool inserts for cutting, spreading or pushing. When used, such tools are subjected to extremely high mechanical loads and the most diverse environmental influences (heat, cold, and moisture), depending on the place of use.

It is hereby of particular significance that, when used, rescue tools in particular ensure a particularly high level of operational reliability, since rescue operations must always be performed quickly and unexpected operational malfunctions can therefore have fatal consequences.

Furthermore, such work tools are subjected to ever higher mechanical stresses over time when in use. This is because, e.g., in the realm of automobile construction, increasingly higher-strength materials are used, which must be cut through by a cutting tool, for example. However, operating such work tools also requires extensive experience. If, for example, a cut on a so-called B-pillar of a car is made using a cutting tool, the two blades of the cutting tool initially penetrate swiftly into the material. The cutting process then slows down and the cutting process stops. If there is sufficient force on the cutting tools, micro-cracks form, which migrate in the material. One cannot see these micro-cracks with the naked eye. Inexperienced operators think that the tool has reached its performance limit, set the cutting tool down in this situation, and then start the cut again. By contrast, in such a situation, an experienced operator waits for a certain period of time, whereby the full load of both blades remains on the cut material. During this period of time, the micro-cracks migrate further until, due to the applied load of the blades, the material ultimately breaks off due to the continuation of the micro-cracks and the resulting macro-cracks. In contrast however, a situation may also occur in which the material to be cut actually is too hard and excessive waiting at full load does not result in the desired cutting of the material. Consequently, identifying these situations has been difficult to date.

Another problem of such tools is that the opening and closing times of the work tools in question can be very long depending on the application situation. For example, a rescue ram is 40 cm long in its retracted state but 150 cm long in the extended state. Consequently, it can happen that extending the rescue ram to the required length of the piston requires a relatively long time until it is extended to the needed length. Since a rescue operation always involves an extraction to be performed as quickly as possible, there is an urgent need to keep the opening and closing times as short as possible for work tools having a displaceable piston rod.

Although electrohydraulic work tools do have hydraulic proportional valves, the opening and closing times of the work tool can only be influenced to a minor degree, however.

Documented Prior Art

WO 2012/019758 A1 describes a control device for a first and second work tool, in which the output is controlled by two pumps connected in parallel via a single hydraulic switch valve, whereby the output of both pumps is provided solely to a first pressure line or solely to a second pressure line or to the first and second pressure lines together in a certain proportion to each other. The selection is made via the respective position of the hydraulic control valve.

A method for operating a hydraulic pump arrangement is known from WO 2013/127452, in which load-dependent controlling occurs as a function of the motor current in such a manner that switching occurs from a load state to a no-load state and vice versa as a function of said motor current. The method is used to save energy and thereby conserve the rechargeable battery.

Object of the Present Invention

The object of the present invention is to improve the usage effectiveness of a generic hydraulic pump arrangement for a work tool for portable use.

Solving the Objective Problem

According to the invention, the electronic control and regulation unit determines, in addition to a first operating state in which the electric motor is operated at a first frequency F1, a second operating state in which the electric motor is operated at a second frequency F2, wherein by means of manually operable switching means, the operating state can be switched by the operator of the work tool between a first and second operating state, and wherein the rotational speed of the electric motor in the second frequency F2 is higher than in the first frequency F1. The piston rod can hereby be extended or retracted significantly faster, than with previous work tools, if needed by switching over to the second frequency F2. One can hereby forego an arrangement of two separate pumps connected in parallel with each requiring to be driven by associated electric motors. The function of switching over the electric motor to the second frequency F2 (turbo mode) can be implemented simply in a portable, rechargeable battery-driven work tool. The magnitude of the frequency to be selected thereby determines the rotational speed of the electric motor and is freely selectable. The higher the frequency, the faster the electric motor rotates to drive a downstream mechanism or a downstream hydraulic pump. According to the invention, the electric motor involves a brushless direct current motor (or "electronically commutated motor" or "ECM" or "EC motor").

For practical purposes, the switching-over from the first frequency F1 to the second frequency F2 is only possible in a partial range of the total power spectrum of the electric motor. In particular, when it comes to electrohydraulic work tools, a switch-over to the second operating state is no longer possible starting at a predetermined pressure (e.g., 500 bar). Mechanical problems in the hydraulic circuit are hereby avoided.

Preferably, the switchover occurs in each case between constant frequencies F1 and F2, respectively.

For practical purposes, the ability to switch over from the first frequency F1 to the second frequency F2 is undertaken in a power consumption-dependent manner. For example, a power consumption threshold SW may be specified, above which the switchover from the first frequency F1 to the second frequency F2 or operating the work tool at the second frequency F2 is no longer possible. This measure serves to perform a plausibility check as to whether an operating state exists with which one can actively work (cutting, spreading or pressing) or with which only the tools should be opened or closed. If the cutting tool of the work tool has already penetrated the material for example, a switchover from the first frequency F1 to the second frequency F2 can no longer occur.

By the fact that a hydraulic control valve (hydraulic multiport valve) is provided for switching the movement direction of the piston rod, and actuating the control valve causes the switchover of the operating mode between the first and second operating mode, the intuitiveness of utilizing the work tool is maintained for the operator, which is an advantage in a rescue operation. In regard to the movement direction of the piston rod as well as the operating state of the electric motor, the operator turns on only the control valve. The operator operates the rescue tool as usual. There is only one additional operating function on the otherwise unmodified control valve.

To the extent the control valve is a rotary valve, which comprises in particular a ring-shaped grip or star grip, actuation of the operating mode switchover between a first and second operating mode can take place by simply rotating the control valve by an additional angle range Aa to the actual angle range of actuating the control valve. Thus, to switch over the electric motor from the first to the second operating state, the operator rotates the rotary valve only by the additional angle range Aa.

For practical purposes, the control valve is a so-called proportional valve, in which the transitions of the valve settings are continuous, by means of which variable volume flows can be achieved. The switchover capability according to the invention from the first to the second operating mode is superimposed on to the proportional valve and is comparable to a type of "kick-down" functionality.

Due to the fact that according to the invention the heat W created by the drawn current A of the electric motor while in operation is measured and used as a control variable, damaging influences due to an excessively long overload operation can be effectively prevented. Simultaneously however, the operator can also go "up to the limit" better than before without having to continuously consider whether the current operating mode is still on one side of the load limit or already on the other side. Individual experience levels of operators hereby become irrelevant. The mission's chances of success increase. The mission-related effectiveness of the generic hydraulic pump arrangement is hereby substantially improved.

Preferably, the heat W, which is created by the drawn current A of the electric motor while in operation, is recorded in the electronic control and regulation unit or at least in its local vicinity, particularly in the region of the printed circuit board or semiconductor assemblies (e.g., in the region of the IGFETs or MOSFETs) thereof. The heat W is generated there in particular, generated by the drawn current A of the electric motor while in operation, and it can thus be recorded there particularly well.

To record the heat W or the temperature or the temperature increase, a first temperature probe or temperature sensor can be provided, which records the heat W created by the drawn current A of the electric motor while in operation and forwards it to the electronic control and regulation unit. This may involve an electric or electronic component, which supplies an electric signal as a measure of the temperature. In particular, these may be components, which change their resistance as the temperature changes (e.g., PTCs, NTCs) or components, which supply a processable electric signal directly (e.g., use integrated semiconductor temperature sensors (solid state circuits) or the temperature-dependency of the base emitter voltage of a diode-connected transistor).

In particular, the electric motor can be designed in such a manner that the rotational speed of the electric motor remains, at least essentially, constant when subjected to a load during the execution of a task and only the current drawn by the electric motor increases when subjected to a load.

Furthermore, according to the invention, the ambient temperature T on the work tool can also be measured and included in the control process. In particular the sum, or if necessary the ratio, of heat generated by the drawn current A of the electric motor during operation and the ambient temperature T on the work tool can also be utilized for control purposes. This is advantageous since the ambient temperature has an additional influence on the heat build-up of the semiconductor assemblies, and also in a switching process, a heat build-up can occur in a time-delayed manner due to the drawn current A of the electric motor. With the additional measurement of the ambient temperature, one can thereby measure the heat build-up even more precisely.

For practical purposes, the hydraulic pump arrangement for measuring the ambient temperature T comprises a second temperature probe. It may hereby be an electric or electronic component, which supplies an electric signal as a measure for the temperature. In particular, these may be components, which change their resistance as the temperature changes (e.g., PTCs, NTCs) or components, which supply a processable electric signal directly (e.g., integrated semiconductor temperature sensors (solid state circuits) or use the temperature-dependency of the base emitter voltage of a diode-connected transistor.

The current A drawn by the electric motor can be limited and/or the electric motor can completely shut off within the scope of the control process. In both cases, this measure results in a reduction of the overheating or heat, and thus to an effective protective measure when operating the work tool.

The switching process that limits the current A drawn by the electric motor and/or shuts off the electric motor occurs for practical purposes by taking into consideration a time delay t. This is advantageous since overheating occurring in a time-delayed manner can hereby be prevented.

To establish or determine the time delay t, one can advantageously also use the ambient temperature T.

Preferably, the work tool according to the invention comprises a display device, which in turn comprises the following:
  a load display, in which the output of the work tool is displayed on the basis of the current A drawn by the electric motor while in operation, and/or an operating status display, which shows in what operating status the work tool is or whether the work tool is in a second operating mode, and/or a full load operating status display, which shows that a full load-duration has been exceeded, and/or a temperature display that shows the range in which the current operating temperature of the semiconductor component lies.

The load display shows the operator whether the work tool is in a state in which a load can additionally be generated or in which full-load operation exists. The load display can be executed as a light bar arrangement, for example. The operating status display gives the operator information as to whether the work tool is in a first or second operating state. The full-load operating status display shows that a full-load duration has been exceeded so that the operator can stop operations to re-start the work tool, for example. The temperature display gives the operator information regarding the range in which the temperature of the semiconductor assembly lies, particularly in what range of a possible total range the current operating temperature lies.

Preferably, the load display may include a warning mode, which indicates that the work tool is currently in the overload range. The operator hereby becomes aware that the work process is to be stopped. The mission effectiveness is thereby substantially increased.

For practical purposes, the work tool comprises the following:

A hydraulic pump,
A hydraulic reservoir,
A piston rod,
A hydraulic cylinder for holding the displaceable piston rod,
Hydraulic lines and/or
A compensation device.

DESCRIPTION OF THE INVENTION BY MEANS OF EMBODIMENTS

Figure 2:
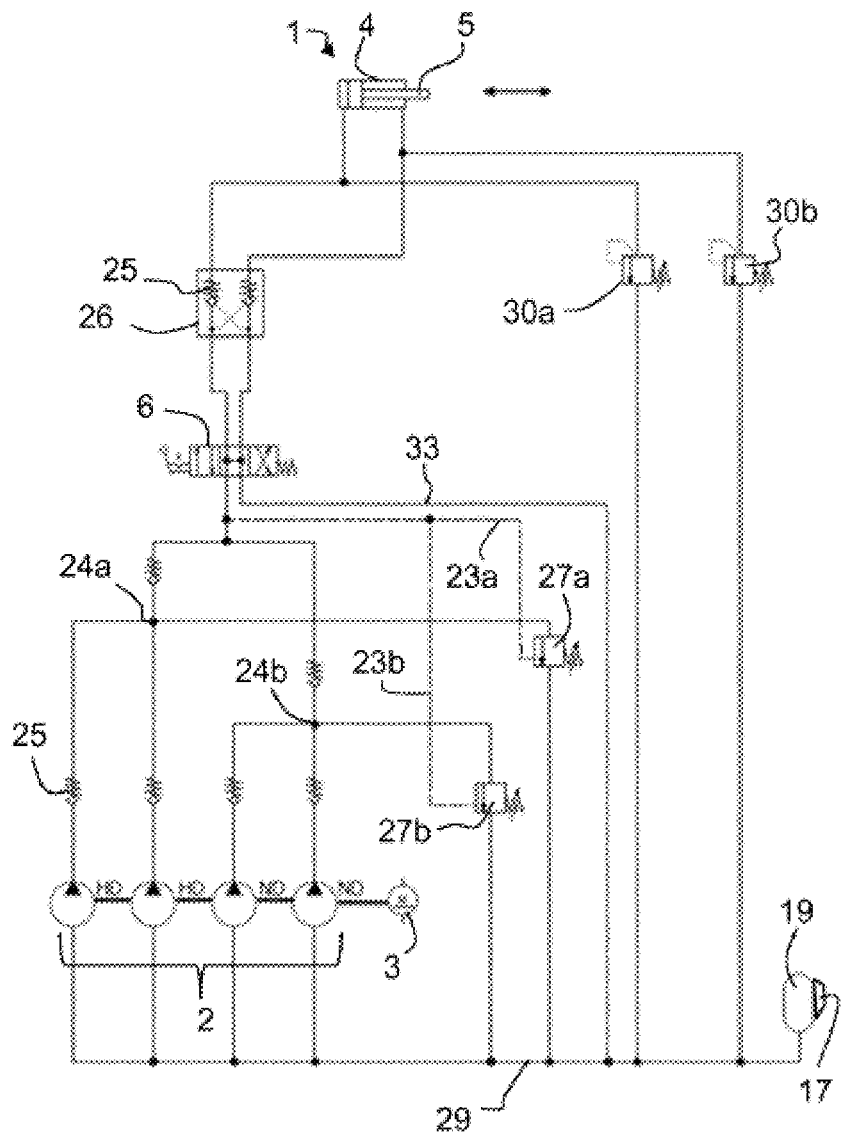
Figure 3:
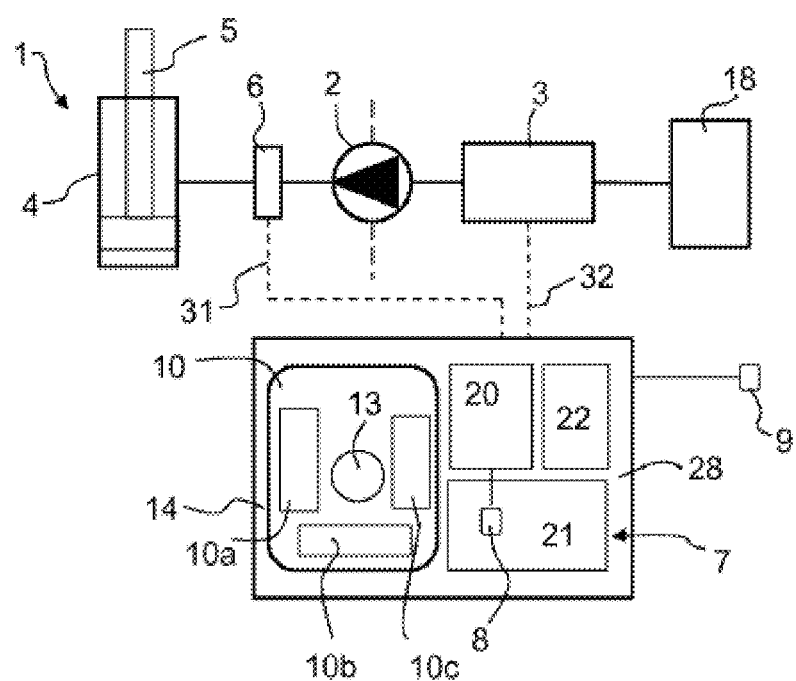
Figure 4:
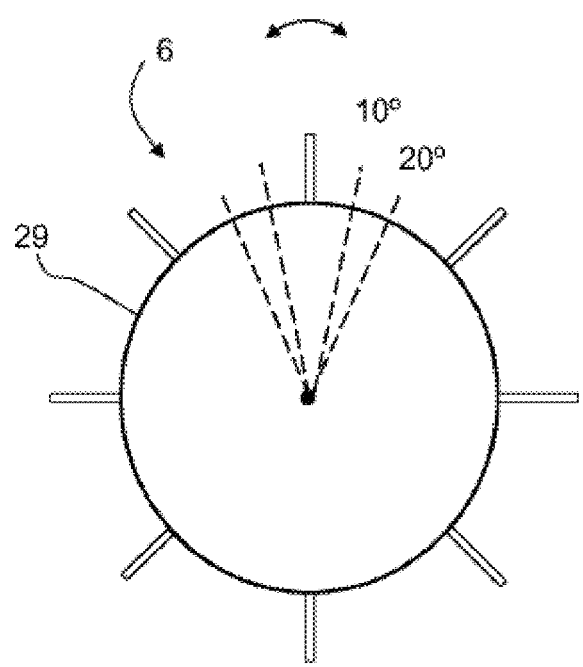
Figure 5:
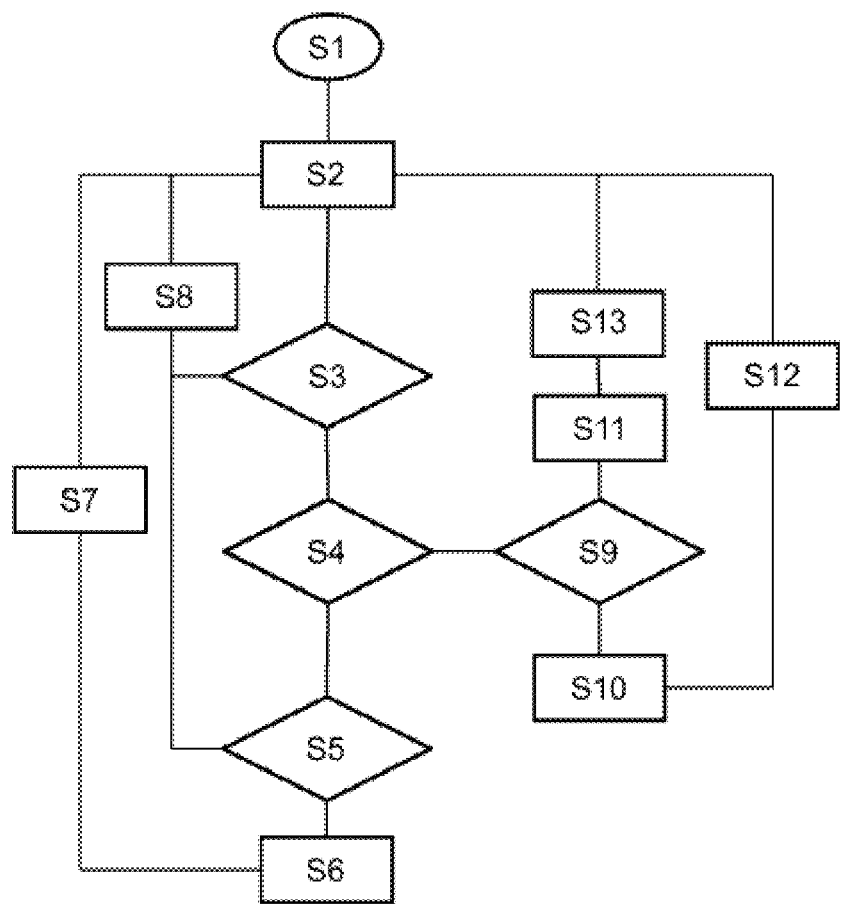
Figure 6:
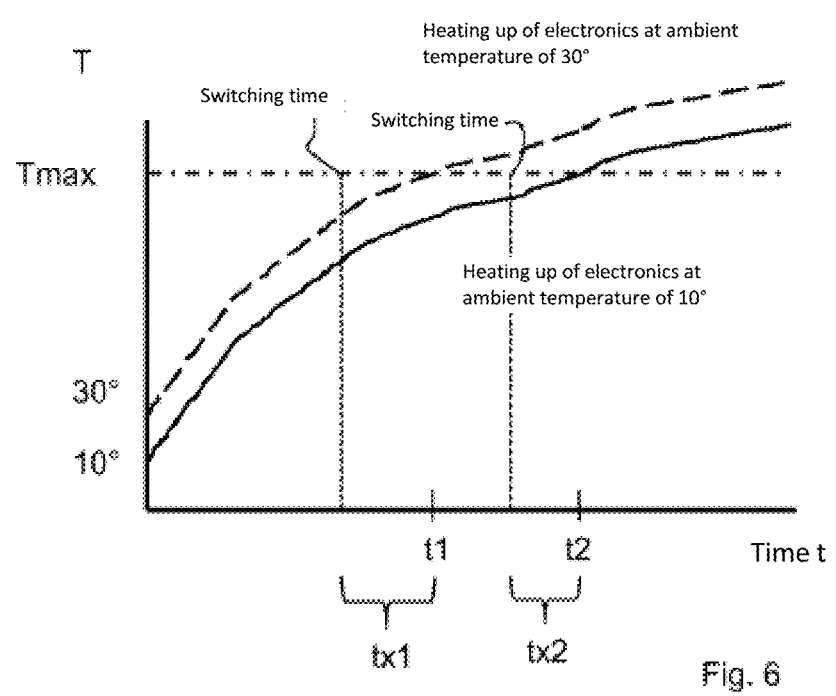
Figure 7:
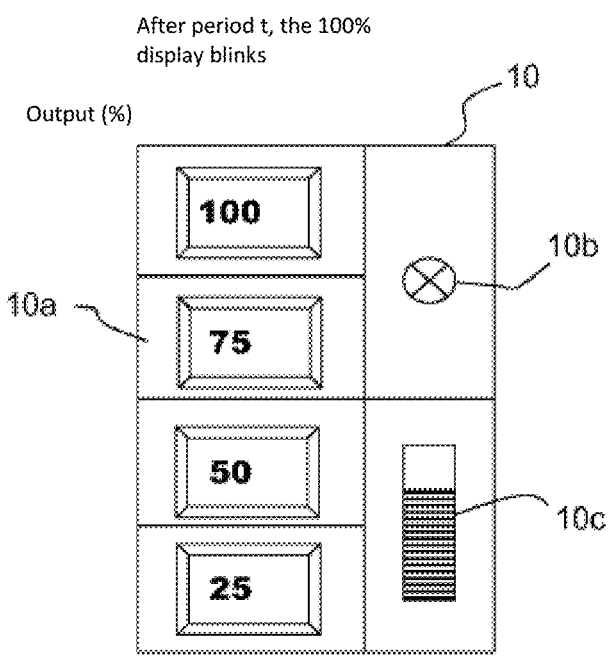

A suitable embodiment of the present invention is described in greater detail below. For the sake of clarity, recurring features are labeled only once with a reference sign. Depicted are:

FIG. 1 the representation of a full view of a work tool in the form of an electrohydraulic, battery-operated cutting tool;

FIG. 2 an example of a hydraulic circuit diagram of the cutting tool according to FIG. 1;

FIG. 3 a highly simplified schematic representation of the essential components of the overload protection of the work tool according to FIG. 1;

FIG. 4 a highly simplified schematic representation of the functional switch positions of the control valve of the work tool according to FIG. 1;

FIG. 5 a flow chart for controlling the motor output of the work tool according to FIGS. 1 and 2;

FIG. 6 a comparative representation of the heating-up of the electronics of the work tool according to FIG. 1 given various ambient temperatures; as well as FIG. 7 an example of a display device for the output of the work tool according to FIG. 1.

The reference sign 1 in FIG. 1 refers to the work tool in its entirety according to the invention. In the embodiment according to FIG. 1, the work tool 1 is an electrohydraulic, battery-operated cutting tool (cutter), for example. The work tool 1 comprises a housing 12, in which are located an electric motor 3, a hydraulic pump 2 as well as a hydraulic reservoir 19. In addition, a compensation device 17 is provided for compensating the volume of the hydraulic fluid while the work tool 1 is in operation. It may hereby be a flexible membrane or similar, for example. Attached to the housing 12 is a display 14 as well as an on/off switch 13. The operator can see the operating states on the display 14.

On the front side of the work tool, there are two tool halves 11a, 11b, which are cutting tool halves in the embodiment depicted in FIG. 1. The two cutting tool halves 11a, 11b are driven by means of a piston rod (not depicted in FIG. 1). The latter is located in a hydraulic cylinder (also not depicted). The hydraulic cylinder is located below a cover 28 visible in FIG. 1 in the region of which there is a first hand grip 15. A second hand grip 16 is provided on the housing 2. The work tool 1 can thereby be guided or operated by the operator using two hands. On the rear side of the housing 12, there is provided an insertion bay (not visible in FIG. 1) for a rechargeable battery. By means of a hydraulic valve 6, the operator with a hand on the second hand grip 16 can manually control the direction of the hydraulic flow so that the piston rod is either retracted (wherein the tool halves 11a, 11b are closed) or extended (wherein the tool halves 11a, 11b are opened), or hydraulic fluid is fed back to the supply circuit (bypass operating mode). The embodiment of the control valve 6 depicted in FIG. 1 involves a control valve that is rotatable in the extension of the axis of the hand grip 16 and has a so-called star grip, which is rotated by the operator for actuating the switch positions.

The work tools in question are able to be operated in any spatial arrangement or orientation.

Besides the aforementioned cutting tool, the invention may also comprise a spreading tool, a combination tool having cutting and spreading functions, or a lifting jack or rescue ram. All these tools make use of a piston rod, which is guided in a cylinder, e.g., hydraulic cylinder.

FIG. 2 depicts an example of a hydraulic circuit diagram of the work tool according to FIG. 1. Pump 2 is for example a piston pump having four cylinders for example, wherein two cylinders are provided for high pressure (HD) and two cylinders are provided for low pressure (ND). The respective second line (HD, ND) is subjected to pressure in a time-delayed manner to the first line to generate high pressure (HD) or low pressure (ND). The pump pistons are driven by the electric motor 3. Hydraulic fluid is kept on hand in a hydraulic reservoir 19, to which a compensation device 17 can be arranged for compensating the volume of hydraulic fluid while in operation, for example in the form of a flexible membrane. Each HD and ND outlet of the pump 2 is connected to the control valve 6, which is for example a multiport valve having three switch positions, and to an actuatable relief valve 27a, 27b. Each relief valve 27a, 27b is connected via a control line 23a, 23b to the input side of the control valve 6.

In FIG. 2, in the left switch position of the control valve 6, pressure (HD or ND) is built up in the region of the side, facing away from the piston rod 5, of the hydraulic cylinder 4, by means of which the piston rod 5 is extended, wherein in the right switch position, depicted on the right in FIG. 2, of the control valve 6, a corresponding pressure is built up on the opposite side of the hydraulic cylinder 4 so that the piston rod 5 is hereby retracted. The hydraulic fluid expelled in each case by this actuation is carried back into the hydraulic reservoir 19 via the reservoir line 33.

The middle position of the control valve 6 represents that position in which hydraulic fluid is carried in a bypass operating mode without the piston rod 5 being moved.

If the pump 2 is operated in high-pressure mode for example, the operating pressure splits at a first branch point 24a toward the control valve 6 as well as actuated relief valve 27a. The relief valve 27a is closed via the control line 23a when high pressure (HD) is applied. The relief valve 27a is subjected to a control pressure via an additional control line 23b. The delivery flow of the low pressure elements (ND) also splits at a second branch point 24b and is carried toward the control valve 6 and the relief valve 27b. If the control pressure at the relief valve 27b is now higher than the pressure of the low-pressure elements, then the relief valve 27b is opened and the delivery flow of the low-pressure elements is fed back into the reservoir 19.

Alternatively, if the pump 2 is operated in a low-pressure mode, then the control pressure at the relief valve 27b cannot operate against the delivery flow of the low-pressure elements. Both delivery flows (high and low pressure) are carried toward the control valve 6.

There is a load holding element 26 located between control valve 6 and the hydraulic cylinder 4. The load holding element 26 comprises intersecting control lines. If for example in the left switch position of the control valve 6, there is pressure from pump 2, then the check valve 25 of the load element 26 is opened via one of the two control lines so that hydraulic fluid can flow back. The same applies for the right switch position of the switch valve 6, only in the reverse direction.

The control valve 6 is actuated by hand by means of a handle and is spring-loaded. By means of the handle of the control valve 6, the spring force must be overcome both for the left as well as for the right position of the control valve 6. As soon as the handle is released, the control valve 6 automatically moves back into the initial position (middle position). For practical purposes, the control valve may be a so-called proportional valve, in which the line cross-section for hydraulic fluid is continuously increased or decreased, i.e., there are no abrupt transitions. Located between the hydraulic pump 2 and the control valve 6 are check valves 25 in each case.

The electric motor 3 is in particular a so-called brushless, direct current motor, which in regard to its rotational speed, can be controlled or regulated via a control and regulation unit.

FIG. 3 depicts a highly simplified schematic representation of the essential components of an overload protection of the work tool 1. The components, such as the hydraulic cylinder 4, the piston rod 5, the control valve 6, the pump 2, the electric motor 3 as well as the rechargeable battery 18 are represented in a simplified manner. For clarity's sake, FIG. 3 uses only on single pump symbol in regard to the pump 2. Hydraulic return lines to the reservoir are not depicted for clarity's sake.

To operate the electric motor 3, a control and regulation unit 7 is provided, which has the display 14. The control and regulating device 7 is connected via a control line 32 to the electric motor 3, and via a control line 31 to the control valve 6. The control and regulation unit 7 comprises a microcontroller 20 as well as frequency converter 21. The control and regulating unit 7 or the microcontroller 20 may comprise a (non-depicted) memory. Furthermore, the control and regulating unit 7 comprises a current detector 22, with which the current drawn by the electric motor 3 can be detected.

The rechargeable battery 18 housed in the work tool provides the electrical energy for the electric motor 3 and specifically in the form of a voltage and current. The voltage drops as the rechargeable battery increasingly loses its charge. The electrical energy is stored in the frequency converter 21, which comprises a plurality of so-called MOSFETs. These are electronic switches, which have a certain electrical resistance. The purpose of the frequency converter 21 is to convert the direct current from the rechargeable battery 18 into an alternating current. The alternating current is distinguished by a voltage, a current and a frequency. The frequency level is thereby determined by the rotational speed of the electric motor 3. The higher the frequency, the faster the electric motor 3 turns. The voltage hereby remains largely constant. Since a rapidly rotating motor requires more energy, a correspondingly elevated power demand is established for an elevated rotational speed of the motor. This in turn results in a power loss, which is all the greater the higher the electrical current drawn by the electric motor 3. The power loss is converted into heat and heats up the MOSFETs of the frequency converter 21.

By means of the electronic control and regulation unit 7 of the electric motor 3, a first operating state is established, in which the electric motor 3 is operated at a first frequency F1 or rotational speed. In addition, by means of the electronic control and regulation unit 7, a second operating state is established in which the electric motor 3 is operated at a second frequency F2, wherein the rotational speed of the electric motor at the second frequency F2 is higher than at the first frequency F1. Furthermore, preferably manually operable switching means are provided, which enable an operator of work tool 1 to switch between a first and a second operating state. While operating, a type of turbo function within the meaning of a "kick-down" can hereby be executed in which the piston rod 5 of the hydraulic cylinder 4 can be moved particularly fast to bring the tools into the work position as quickly as possible. In this way for example, a rescue ram can be brought very quickly from a retracted state having a length of 40 cm for example to an extended state having a length of 150 cm for example.

In the region of the frequency converter 21, there is a first temperature probe 8, with which the heat, i.e., heat loss, is measured in the region of the frequency converter 21 or the MOSFETs located inside of it and is supplied to a control process.

Furthermore, the control and regulation unit 7 comprises a second temperature probe 9, which is provided for measuring the ambient temperature, which can also be utilized in the control process. The second temperature probe 9 may be positioned in the region of a (non-depicted) opening of the housing 2. The temperature probes are preferably components, which change their resistance when the temperature changes (e.g., PCTs, NTCs), or components that provide a processable electric signal directly (e.g., utilize integrated semiconductor temperature sensors (solid state circuits) or the temperature-dependency of the base emitter voltage of a diode-connected transistor).

The display 14 comprises a display device 10, which in turn may comprise for example a load display 10a and/or an operating status display 10b and/or temperature display 10c; cf. FIG. 7.

The control and regulation unit 7 as well as the display 14 are preferably arranged on a common printed circuit board 28. However, they can also be arranged on separate printed circuit boards.

The control and regulation unit 7 is connected to the control valve 6 via the control line 31. The purpose of this measure is that not only can the operator control the movement direction of the piston rod (extension, retraction or bypass position) via the control valve 6, but the operator can also switch the operating state between the first and second frequency F1 and F2, respectively, via a control signal triggered by the control valve 6. The operator can thereby activate or deactivate the turbo function of the work tool 1 at any time while in operation without releasing the control valve 6.

FIG. 4 illustratively depicts in a simplified schematic representation the various switch positions of the control valve 6 of the work tool 1. In regard to the control valve 6 in FIG. 4, only the actuating element of said control valve is shown, which in this special case is a so-called rotatable star grip 29. In the position of the star grip 29 shown in FIG. 4, the control valve 6 is in its middle position, in which the piston rod 5 is neither retracted or extended, and only hydraulic fluid is carried back to the reservoir via the respective relief valve 27a, 27b, without the piston rod 5 being moved. If, for example, the star grip 29 is now rotated by an angle of 10° to the left in FIG. 4, the control valve 6 is brought into the left switch position depicted for example in FIG. 2. However, if the star grip 29 is rotated by 10° to the right, the control valve 6 is placed in the right switch position in FIG. 2. The switchover of the electric motor from the lower frequency F1 to the higher frequency F2 also occurs by actuating the star grip 29. Preferably, to this end the star grip 29 may be rotated by an angle range of 20° to also activate the turbo function when retracting or extending the piston rod 5. The implementation of the work tool 1 is hereby particularly simplified. As soon as the operator releases the star grip 29 in the deflected position, the latter is necessarily rotated back by a spring force into the starting position depicted in FIG. 4. If the star grip 29 is rotated back only by an angle range of 10°, the turbo function is deactivated during the retraction or extension of the piston rod 5. A switching point that can be overcome by force may be provided between the angle or the angle range of the normal function and the angle or angle range of the turbo function.

On the basis of FIG. 5, the control of the turbo function as well as the overload protection is explained in greater detail below. For control purposes, the following parameters are predefined:

N0=the lower limit of the rotational speed (rotational speed without turbo function)
Nmax=the upper limit of the rotational speed (maximum rotational speed with turbo function)
N=the precisely measured, current rotational speed of the system
Na=the last measured rotational speed, which is stored in the memory
Imax=the maximum current drawn by the electric motor
Tmax=the maximum temperature in the region of the first temperature probe Initially, in a first step S1, the last measured rotational speed Na is set on the lower limit of the rotational speed NO. In a step S2, the current rotational speed N, the currently drawn current I as well as the current temperature are measured in the region of the first temperature probe 8. In a verification step S3, one verifies whether the turbo function is activated or not. If the turbo function is not activated, the parameters N, I and T are re-measured (step S2) after a certain time (step S8).

However, if the turbo function is activated, in an additional step S4 one measures whether the current rotational speed N is less than Nmax, the measured current I is less than Imax and the measured temperature T is less than Tmax. If these conditions are met, in an additional step S5, one verifies whether the measured rotational speed is less than a defined rotational speed threshold below Nmax. If this is the case, in another step S6, the rotational speed is increased by a certain amount and after a certain waiting period (step S7), the measurement of N, I and T is retaken (step S2).

If the condition in step S4 is not met, in a step S9, one determines whether the measured rotational speed N is greater than N0+x, wherein x is the magnitude of a rotational speed (e.g., 100). If this is the case, in a step S11, one reduces the last measured rotational speed by the rotational speed x (e.g., 100) and stores it as Na in the memory, one waits over a certain period of time (step S13) and then one takes another measurement (step S2). If the condition in step 9 is not met, the lower rotational speed limit NO is entered into the memory as the last measured rotational speed. The rotational speed can hereby not be decreased any further. In this case, a warning message is issued in step S12 according to which the drawn current I and/or the measured temperature T are too high.

Within the scope of the controlling process, an automatic switchover takes place from the second operating state of the higher frequency F2 to the first operating state of the lower frequency F1. This switchover can preferably take place taking into consideration a time delay t, for example by the turbo mode being switched off before the parameter Tmax is reached.

The ambient temperature is preferably to be included in controlling the electric motor, since the ambient temperature in conjunction with the heat generated by the power loss of the MOSFETs achieves different values as a function of the ambient temperature, as is depicted in FIG. 6 in a simplified manner. Thus for example, given an ambient temperature of 30° C., the control and regulation unit 7 must already engage in a substantially earlier manner than when given an ambient temperature of 10° C., as one can see in FIG. 6. The switching times are hereby to be selected taking into consideration a time delay tx in such a manner that even after a shutdown process, the system can still heat up slightly due to its thermodynamic inertia without the maximum temperature being exceeded. A corresponding time delay is also visible in FIG. 6.

FIG. 7 depicts a portion of the display device 10 of the work tool 1 according to the invention. The display device 10 comprises a power display device 10a, which has a plurality of fields, which show the current output in a bar diagram-like manner. In addition to the bars, which are indicated by illumination and/or coloration, a numerical number showing the current output value in percent can be rendered in the respective segment of the bar display. The region 25 corresponds for example to a pressure of 175 bar, the region 50 corresponds to a pressure of 350 bar, the region 75 corresponds to a pressure of 525 bar, the region 100 corresponds to a pressure of 700 bar.

Within the scope of controlling the electric motor 3, a functionality is hereby also provided, which shows the operator when a work step, e.g., a cut, is to be stopped. For practical purposes, this can take place by the power display showing 100% power under full-load operation, wherein after a certain time has elapsed, the 100% display begins to blink. This is the sign to the operator to begin a new work cycle.

In addition, on the display device 10, there may also be provided an operating status display 10b, which shows whether the turbo mode is activated or not. Additionally or alternatively, a temperature display 10c, for example in the form of an alphanumeric display or a bar graph, may be provided for this purpose.

It is once more explicitly pointed out that the combination of individual features as well as sub-features is to be considered essential to the invention and included in the disclosed content of the application.

LIST OF REFERENCE SIGNS

1 Work tool
2 Hydraulic pump
3 Electric motor
4 Hydraulic cylinder
5 Piston rod
6 Control valve
7 Control and regulation unit
8 First temperature probe
9 Second temperature probe
10 Display device
10a Load display
10b Operating status display
10c Temperature display
10d Display device
11 Tool halves
12 Housing
13 On/off switch
14 Display
15 First hand grip
16 Second hand grip
17 Compensation device
18 Rechargeable battery
19 Hydraulic reservoir
20 Microcontroller
21 Frequency converter
22 Current detector
23a Control line
23b Control line
24a First branch point
24b Second branch point
25 Check valve
26 Load holding element
27a Relief valve
27b Relief valve
28 Printed circuit board
29 Star grip
30a Safety valve
30b Safety valve
31 Control line
32 Control line
33 Reservoir line
A Drawn current
F1 Frequency
F2 Frequency
HD High pressure
LD Low pressure
t Time delay
T Ambient temperature
SW Power consumption threshold

The invention claimed is:

1. A portable tool comprising a spreading tool, cutting tool or combination tool having cutting and/or spreading functions, or a lifting tool or a pushing tool for mobile use; the portable tool comprising:
an electric motor comprising a brushless direct current motor;
a rechargeable battery housed in the tool;
a hydraulically driven, displaceable piston rod for spreading and/or cutting tasks and/or lifting or pushing;
a hydraulic control valve for switching a movement direction of the piston rod actuated by an operator;
an electronic control and regulation unit for controlling and/or regulating the electric motor;
wherein the electronic control and regulation unit establishes a first operating mode, in which the electric motor operates at a first frequency, and wherein the electronic control and regulation unit establishes a second operating mode, in which the electric motor is operated at a second frequency,
wherein the operating mode is switched between the first operating mode and the second operating mode by the hydraulic control valve actuated by the operator of the tool;
wherein rotational speed of the electric motor is higher in the second frequency than in the first frequency.

2. The tool according to claim 1, wherein the switching from the first frequency to the second frequency is enabled only in a sub-range of an entire power spectrum of the electric motor.

3. The tool according to claim 1, wherein the rotational speed of the electric motor is constant in the first frequency as well as the second frequency.

4. The tool according to claim 1, wherein a power consumption threshold is specified, above which switching from the first frequency to the second frequency or operation of the tool in the second frequency is not possible.

5. The tool according to claim 1, wherein the control valve is a rotary valve, wherein switching the movement direction of the piston rod in the first operation mode occurs by rotating the control valve by an angle range and triggering the switching of the operating mode between the first operating mode and the second operating mode occurs by rotating the control valve by an additional angle range.

6. The tool according to claim 1, wherein heat created while operating by drawn current of the electric motor is recorded and used as a control variable.

7. The tool according to claim 1, wherein heat created while operating by drawn current of the electric motor is recorded in a local region of the electronic control and regulation unit.

8. The tool according to claim 1, further comprising a first temperature probe, which records heat created while operating by drawn current of the electric motor.

9. The tool according to claim 8, wherein ambient temperature is recorded and included in controlling.

10. The tool according to claim 8, further comprising a second temperature probe.

11. The tool according to claim 1, wherein controlling the electric motor is based on drawn current, heat created by the drawn current of the electric motor and/or the ambient temperature.

12. The tool according to claim 1, wherein an automatic switchover from the second operating mode to the first operating mode or a shutdown occurs within a scope of controlling.

13. The tool according to claim 12, wherein the automatic switchover occurs taking into consideration a time delay.

14. The tool according to claim 1, wherein a display device is provided comprising:
a load display, in which output of the tool is displayed based on a current drawn by the electric motor while operating, and/or
an operating status display, which shows that the tool is in a second operating mode, and/or
an operating status display, which shows that duration of maximum output of the motor is exceeded, and/or a temperature display, which shows a range in which current operating temperature of semiconductor elements of the electronic control and regulation unit lies.

15. The tool according to claim 14, wherein the load display has a warning mode, which shows that the tool is in an overload range and operation must be stopped.

16. The tool according to claim 1, wherein the tool comprises:
   a hydraulic pump; and/or
   a hydraulic reservoir; and/or
   a hydraulic cylinder for holding the displaceable piston rod; and/or
   hydraulic lines; and/or
   a compensation device.

* * * * *